Sept. 10, 1963  L. E. NELSON ETAL  3,103,330
RAPID HARNESS ADJUSTMENT SYSTEM FOR BALLOONS
Filed May 31, 1961
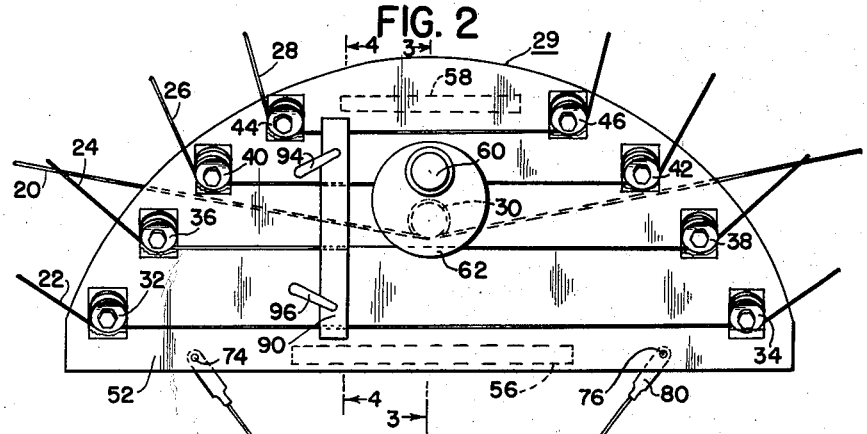
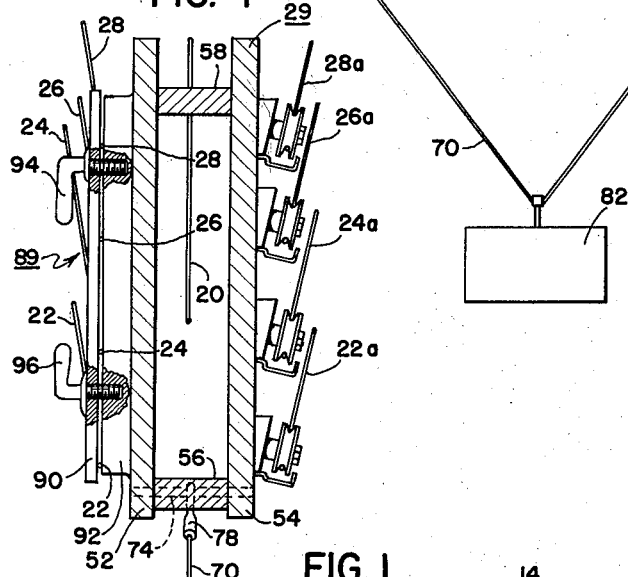
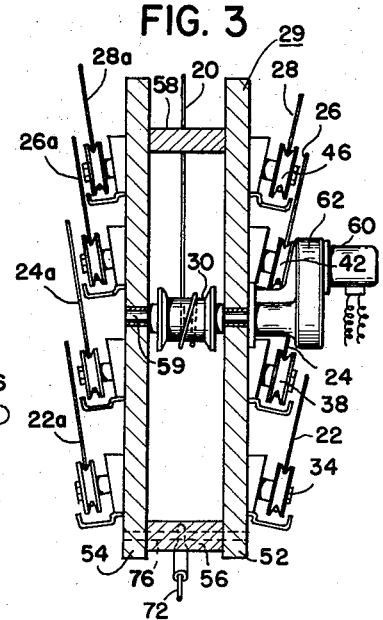
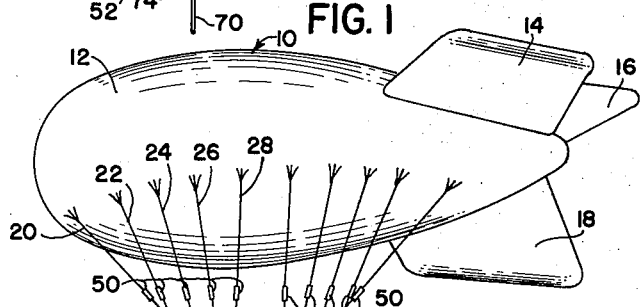
INVENTORS
LEROY E. NELSON
PAUL A. H. PANKOW
BY
Allen M. Sutton
ATTORNEY United States Patent Office 3,103,330
Patented Sept. 10, 1963

3,103,330
RAPID HARNESS ADJUSTMENT SYSTEM
FOR BALLOONS
Leroy E. Nelson and Paul A. H. Pankow, both of Minneapolis, Minn., assignors to General Mills, Inc., a corporation of Delaware
Filed May 31, 1961, Ser. No. 113,953
5 Claims. (Cl. 244—93)

This invention relates to airships, dirigibles, elongate balloons and the like, and more particularly to a rapid harness adjustment system for allowing a load to be moved forward or backward with respect to the axis of the balloon.

In the balloon field there has been considerable activity in connection with transporting articles by means of aerodynamically shaped balloons or dirigibles formed from lightweight flexible gas impervious material. Whether such a balloon is towed by another aircraft or is tethered to the ground, it is desirable to provide means for quickly and easily changing the position of the load either forward or backward with respect to the axis of the balloon. Moving the load from front to back with respect to the axis of the balloon will effect the drag on the balloon and the angle of attack which in turn determines the aerodynamic lift and, therefore, the stability. To distribute the load evenly over the surface of the balloon, a large number of harness cables are required. Heretofore, it has been difficult to provide longitudinal adjustment of the load and yet maintain the load on each cable approximately constant. It has been common practice to tie the lower end of each harness cable individually to a collection device and to adjust the length of each cable as it is tied in order to determine the position of the load with respect to the balloon. This is a tedious and time consuming task and very often results in improper positioning of the load. Furthermore, in some cases, even though the load is not positioned as well as it might be, a flight will nevertheless be undertaken since the re-tying of all of the cables is such a time consuming operation.

Thus, it is an important object of this invention to provide an improved means for rapidly and conveniently changing the position of the load longitudinally with respect to the axis of a balloon.

It is another object of the present invention to provide a relatively inexpensive and simple apparatus for carrying out this end wherein the harness collection device is readily movable longitudinally of the balloon.

It still a further object of this invention to provide an improved harness adjustment system wherein each cable is subjected to substantially constant tension despite changes in the position of the load longitudinally with respect to the axis of the balloon.

It is a still further object of the present invention to provide an improved harness adjustment system which may if desired be operated from a remote vantage point during flight.

It is a still further object of the present invention to provide an improved harness adjustment system wherein the load may be moved longitudinally below the balloon as desired and then locked in a selected position.

Briefly stated, the present invention provides a harness adjustment apparatus for shifting a load forward and backward along a line parallel to the axis of an elongate balloon or dirigible, which includes a plurality of harness cables suspended below the balloon and a harness collection device suspended from the cables by means of a plurality of pulleys rotatably mounted on the harness collection device. Each of the harness cables is entrained over at least one of the pulleys and each of the harness cables supports an approximately constant load. The harness collection device can be moved with respect to the cables by means of a suitable drive system connected to one of the pulleys longitudinally of said balloon.

According to one preferred embodiment of the present invention, there is provided a harness collection device comprising two parallel plates having pulley means mounted on the outer sides thereof which transfers the force from the load to the harness cables entrained over the pulleys. The pulleys enable the harness collection device to be moved with respect to the cables so that the angle of attack of the balloon can be altered as desired. At least one of the pulleys comprises a driven pulley, as described more fully hereinbelow, which may be operated by any suitable drive means such as an electric motor or a hand operated crank. After the correct angle of attack has been established, the cables can be secured and locked in position by means of a locking device.

The harness collection device is readily movable because the sum of the lengths of the segments of each cable on either side of the collection device is nearly constant when the collection device is moved, yet the load is nearly constant in each of the several harness cables. The present invention makes it possible to change the position of the harness collection device either before or after the load has been placed on the balloon and even after the balloon has become airborne. Minor adjustments in the tension of individual cables may be made with suitable turnbuckles.

Further objects and advantages of the invention will become apparent from the following description of one embodiment thereof, taken in conjunction with the accompanying drawing, in which:

FIGURE 1 is a perspective view of a balloon incorporating the present invention;

FIGURE 2 is a side elevation of the harness collecting apparatus of FIGURE 1;

FIGURE 3 is a transverse sectional view taken along the line 3—3 of FIGURE 2; and FIGURE 4 is a transverse sectional view taken along the line 4—4 of FIGURE 2.

FIGURE 1 illustrates the invention as applied to a gas filled elongate airship, dirigible or balloon 10 comprising an elongate envelope 12 formed from a thin flexible gas impervious material such as polyethylene film or a coated fabric and including tail fins 14, 16, 18, which are filled with a suitable lifting gas. Connected to the left side of the envelope along a line extending longitudinally of the balloon are a plurality of harness cable loops designated 20, 22, 24, 26 and 28, and similarly connected to the right side of the envelope are a plurality of cables 22a, 24a, 26a and 28a. Both ends of each cable are connected to the same side of the envelope, and the center portion of each cable passes under pulleys attached to a harness collection device shown generally by the numeral 29. Thus, as best seen in FIGURES 1 and 2, cable 20 passes around a pulley 30, cable 22 passes under pulleys 32 and 34, cable 24 passes under pulleys 36 and 38, cable 26 passes under pulleys 40 and 42, and cable 28 passes under pulleys 44 and 46. Cables 22a, 24a, 26a and 28a pass under pulleys mounted on the other side of the harness adjustment device which are similar in all respects to those designated 32 through 46.

To keep the cables from becoming tangled or from crossing and rubbing against one another, the pulleys associated with cables whose ends are tied to the envelope farther apart are connected to the harness collection device 29 below and spaced farther apart from those pulleys associated with cables whose ends are connected to the envelope closer together. Thus, pulleys 32 and 34 are positioned below and spaced farther apart than are pulleys 36 and 38; pulleys 36 and 38 are placed below and spaced farther apart than pulleys 40 and 42; and pulleys 40 and 42 are below and spaced farther apart than pulleys 44 and 46. It will also be noted that the cables whose ends are spaced farther apart are longer than those secured to said balloon at positions spaced closer together. The pulleys associated with cables 22a, 24a, 26a, and 28a are mounted in the same manner as described with respect to pulleys 32 through 46.

While other arrangements for mounting the cables are possible, it is preferred that the cable ends attached nearest the ends of the balloon comprise the ends of the first loop (cable 20), the ends secured to the envelope next inside of the first two mentioned ends comprise the ends of a second loop (cable 22), those next inside of the second loop comprise the ends of third loop (cable 24) and so on. In other words, it is preferred that ends of each loop are so spaced that the center points on the balloon envelope 12 between the points of attachment of opposite ends of each loop on each side coincide. By mounting the cables in this way, the load on each cable remains substantially constant as the harness adjustment device is moved longitudinally parallel to the axis of the balloon, and the harness adjustment device is readily movable since the sum of the length of cable segments on each side of the harness collection device 29 of any of cables 20, 22, 24, 26, or 28 remains substantially constant. To adjust the tension of the harness cables initially or to make minor adjustments in the tension of the harness cables after the harness collection device is placed in a new position, a suitable turnbuckle 50 is provided in each harness cable.

The harness adjustment device 29 consists of two semicircular plates designated 52 and 54 held in spaced apart parallel relationship by means of suitable braces 56 and 58 at the bottom and top, respectively. Each of plates 52 and 54 are bored in the center to accommodate suitable bearings for a shaft 59 on which the pulley 30 is mounted. Secured to the outside surface of plate 52 is a suitable reversible electric motor 60 and speed reducer 62 used to drive the shaft 59 and pulley 30. Current may be supplied to the motor 60 by means of a suitable battery mounted on the harness adjustment device or from current supplied through a conductor leading to the ground in the event that the balloon is tethered when the adjustment is made. To move the collection device 29 forward the motor is driven in one direction while to move it backwards the motor is driven in the opposite direction. If desired, other drive means such as a hand operated crank may be used in place of the electric motor 60. Tethering cables, designated as 70 and 72, are connected to the harness collection device 29 by means of metal rods 74 and 76 which pass through cable fasteners 78 and 80, respectively, and are connected at each end to one of the plates 52 and 54. The lower ends of the cables 70 and 72 are attached to a load 82 by any convenient means.

It is often desirable to lock the harness collection device 29 in a selected position. This may be accomplished by means of a locking device 89 (FIGURES 2 and 4), which consists of two clamping members 90 and 92 between which portions of the cables 28, 26, 24 and 22 extend. The member 92 is secured rigidly to the plate 52 and the member 90 can be pressed against member 92 by means of two screw clamps 94 and 96 which are threaded into the member 92. Thus, in moving the harness adjustment device, the screw clamps 94 and 96 are first loosened manually to separate the members 90 and 92 so that the cables 22, 24, 26 and 28 can move freely between them. The motor 60 may then be energized to position the adjustment device, and when it is satisfactorily positioned, the screw clamps 94, 96 are manually tightened thus pressing member 90 against 92 and locking the cables in position.

It is apparent that various adaptations and modifications may be made by one skilled in the art. Therefore, the invention is to be defined only by the scope and spirit of the appended claims.

What we claim as new and desire to secure by Letters Patent of the United States is:

1. Harness adjustment apparatus for shifting a load forward and backward in a direction substantially parallel to the axis of an elongate balloon comprising a plurality of loops of harness cables attached to said balloon substantially along a line extending longitudinally of one side of said balloon, a plurality of loops of harness cables attached to said balloon substantially along a line extending longitudinally of the other side of said balloon, the ends of each of said loops being secured to said balloon with the center points on said balloon between the points of attachment of the ends of each loop on each side being coincident, the cables secured to said balloon at positions spaced farther apart being longer than those cables secured to said balloon at positions spaced closer together, and a harness cable collection device adapted to suspend a load, said device suspended below said balloon solely by the loops of harness cables, a plurality of pulleys rotatably mounted on said collection device, one of said cables entrained around a single pulley, and each of the remaining cables entrained under a pair of pulleys.

2. A harness adjustment apparatus according to claim 1, wherein said shorter cables are entrained under pairs of pulleys positioned above and spaced closer together than pulleys associated with longer cables, and means is provided for locking said collection device in a desired position, thereby preventing movement of said device with respect to said cables.

3. A balloon harness adjustment system for shifting a load forward and backward in a direction substantially parallel to the axis of a balloon including an elongate gas impervious envelope having a nose portion and a tail portion with said envelope being adapted to contain a lifting gas, comprising a plurality of harness cables secured to each side of said envelope substantially on lines extending longitudinally of said envelope, a harness collection device suspended beneath said balloon by means of the harness cables for supporting a load, a plurality of pulleys rotatably mounted on said collection device, said harness cables extending to said collection device from said nose portion and from said tail portion, said harness cables being entrained under said pulleys, drive means operatively connected to at least one said pulley to rotate said pulley in either direction as desired whereby the sum of the lengths of said harness cables extending to said nose portion of the length of said harness cables extending to said tail portion remains substantially constant when said collection device is moved to selected positions with respect to said cables longitudinally of said balloon, and means to prevent movement of said collection device relative to said cables longitudinally of said balloon once said selected position has been established.

4. A harness adjustment apparatus for shifting a load forward and backward with respect to a balloon having an axis, comprising a harness collection device formed by a pair of spaced apart plates, a plurality of pulleys rotatably mounted on said collection device, a single pulley rotatably mounted between said plates, means for suspending a load from said collection device, a plurality of harness cables suspended from below said balloon, both ends of each cable being secured to said balloon substantially along a line extending longitudinally of said balloon, said collection device suspended from said balloon solely by entraining all but one of said cables under a pair of spaced apart pulleys, said other cable entrained around the single pulley mounted between said plates, means for rotating said single pulley thereby moving said collection device with respect to said loops and shifting said load forward or backward with respect to the axis of the balloon, and means for locking said collection device in a desired position thereby preventing movement of said device with respect to said cables.

5. The combination of claim 4 wherein the means for rotating the single pulley includes a reversible motor and adjustable means is provided for individually adjusting the tension in each of the cables.

References Cited in the file of this patent

UNITED STATES PATENTS 1,074,830    Blochmann _____ Oct. 7, 1913

FOREIGN PATENTS 338,763    France _____ Apr. 20, 1904